Jan. 7, 1964 J. H. WENSLEY 3,117,220
ELECTRONIC CALCULATING APPARATUS UTILIZING STORED PROGRAMME CONTROL INCLUDING PROGRAMME INTERRUPT FOR ALTERNATE SEQUENCES
Filed June 7, 1960
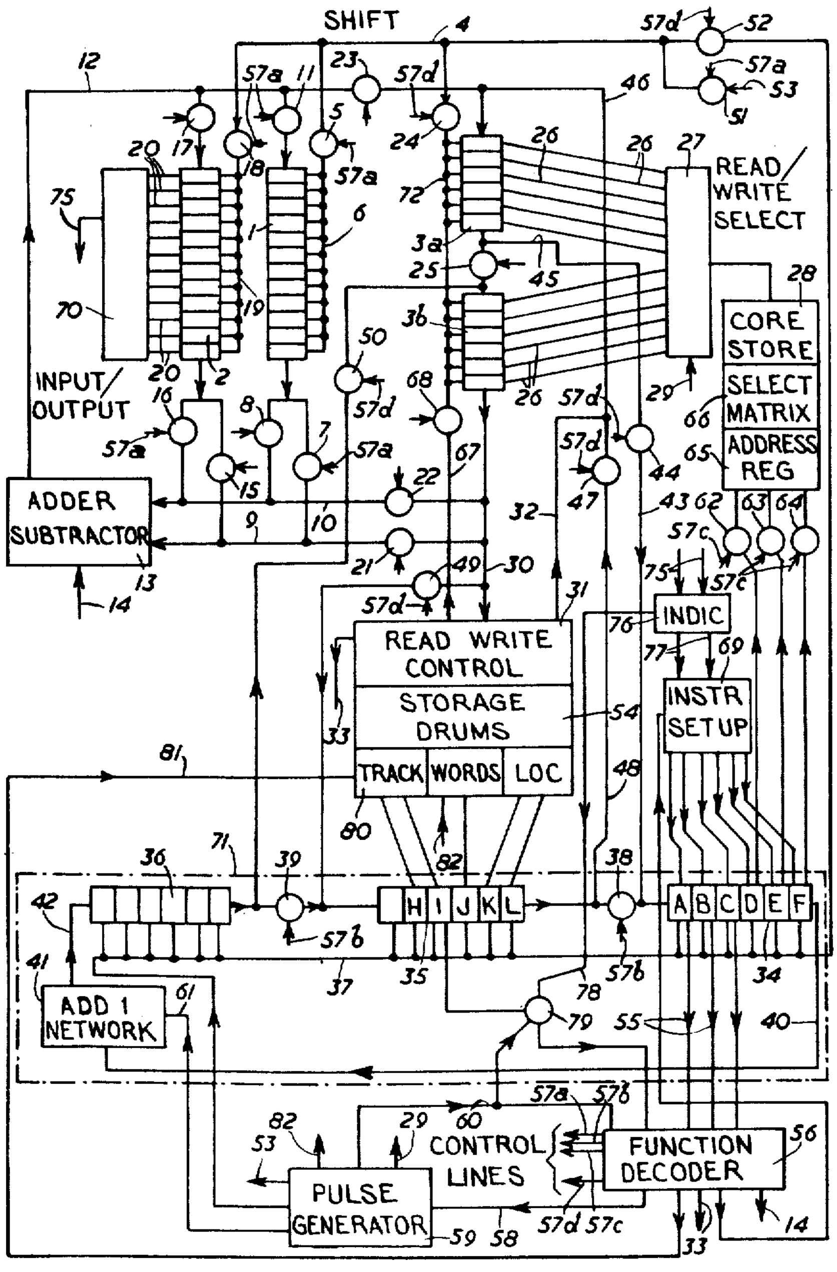
INVENTOR
JOHN HENRY WENSLEY
BY Hane and Nydick
ATTORNEYS United States Patent Office 3,117,220

Patented Jan. 7, 1964

3,117,220

ELECTRONIC CALCULATING APPARATUS UTILIZING STORED PROGRAMME CONTROL INCLUDING PROGRAMME INTERRUPT FOR ALTERNATE SEQUENCES

John Henry Wensley, Berkhamsted, England, assignor, by mesne assignments, to International Computers and Tabulators Limited, London, England, a British company Filed June 7, 1960, Ser. No. 34,549
Claims priority, application Great Britain June 8, 1959
19 Claims. (Cl. 235—157)

This invention relates to electronic data processing apparatus adapted to perform processing operations on data representations under control of a programme of instructions applied to a programme controlling device in a predetermined order.

It has been proposed to arrange electronic data processing apparatus for performing calculations on information representing data items and such apparatus is commonly referred to as a "computer." The information representations may be contained in a number of data registering devices. For example, the items of data contained in two such registers may represent two numerical values to be added together. In this case both values may be shifted out of their respective registers in synchronism and applied to an adding arrangement. The adding arrangement forms the required sum and the resultant value may then be shifted back into another register. This latter register may be one of those from which the original values were shifted out or arrangements may be made to shift the resultant sum into a storage device. Further representations may then be shifted from a storage device into the registers for further calculations to be performed, so that the apparatus is thus capable of performing a number of calculations, each of which is required as a step in a complex computation. The series of steps required for the complete computation is referred to as a programme and each step is therefore known as a programme step. Each programme step requires a specific operation to be performed and each such operation is defined by an appropriate instruction.

The instructions required for the execution of a programme are passed in the required order to a device known as a programme controller. The programme controller contains a register into which an instruction is entered and each instruction is coded into electrical signals which are recognised by the controller. The programme controller is adapted to select, by means of an appropriate decoding arrangement, various combinations of gates and shifting signals to route information from the registers and storage devices along appropriate paths to enable the programme step to be accomplished.

After each programme step has been completed it is necessary that the programme controller shall be re-loaded with the appropriate instruction to enable the next step to be performed. Since the succeeding instruction is commonly stored in the storage device this operation requires that the new instruction shall replace in the programme controller that instruction relating to the programme step which has just been completed, and in consequence a further movement of information by the selection of gates and shifting signals becomes necessary.

Thus, the completion of each programme step is followed by the operation of re-loading the programme controller.

It is an object of the present invention to provide an improved programme control device for data processing apparatus wherein a series of programme instructions constituting a main programme are automatically selected under control of loading instructions and in which means is provided for inserting a loading instruction directly into the programme control device whereby the main programme is interrupted in order to perform an alternative sequence of operations.

It is another object of the present invention to provide an improved programme control device for data processing apparatus into which a programme of instructions is entered from a storage device and having a first register arranged to control the entry of a programme instruction in response to the presence of a leading instruction, a second register into which a loading instruction is transferred after being modified and means for transferring the modified loading instruction therefrom either into the first register or into the storage device.

According to the present invention there is provided programme control apparatus for controlling processing operations performed in electronic data processing apparatus on information in response to a succession of instructions each defining a programme step, derived from a sequence of separately addressable storage locations of a main storage device, including an operation register and a storage register, which apparatus is responsive to the transfer into the operation register of a loading instruction specifying the address of a location in the main storage device to cause a main programme instruction stored in the specified address to be transferred to the operation register concurrently with the transfer of the loading instruction out of the operation register into the storage register, means for modifying the loading instruction during this transfer to specify the address of the next required main programme instruction, means for retransferring the modified loading instruction back into the operation register at the conclusion of a programme step whereby the operation of loading and processing in response to the main programme instructions proceeds alternately, means for entering a loading instruction directly into the operation register to interrupt the main programme and means for transferring a modified loading instruction relating to the main programme from the storage register into a predetermined location of the main storage device.

In accordance with another aspect of the present invention the programme control apparatus includes an operation register arranged to control the processing operations according to the instruction entered thereinto, a storage register and a transfer register, means for selecting a storage location in response to an address specified by an instruction in the operation register, means for transferring a data item between the transfer register and the selected location, means for concurrently transferring a data item from the storage register to the transfer register, from the transfer register to the operation register and from the operation register to the storage register in response to a loading instruction contained by the operation register whereby the operation register is loaded with a programme instruction from the selected storage location, means for modifying the loading instruction during the transfer to specify the address of the next required programme instruction, means for transferring the modified loading instruction directly from the storage register to the operation register at the conclusion of the current programme step and means for directly entering a loading instruction into the operation register.

The invention will now be described, by way of example, with reference to the accompanying drawing which shows in schematic form an electronic data processing or computing apparatus.

Referring now to the drawing, the operation of the computer will be briefly described in order to demonstrate the operation of a programme controller.

The computer contains registers 1, 2 and 3 which are adapted to hold value representations. In the present case the computer is arranged to operate in binary coded decimal mode. This mode of operation is well known and the registers in this case contain a number of stages, each stage being adapted to contain a representation of a decimal digit. Since each decimal digit is represented in binary code each stage includes four triggers each having two stable states and each trigger represents one of the binary code components 1, 2, 4 or 8. One state of a trigger repreesnts the presence of the binary code component in the representation and the other state signifies the absence of the appropriate component. The normal operation of the computer requires that the binary components of a single digit are processed simultaneously while the digits are processed in succession. This mode of operation of a computer is well known so that for the purposes of the present explanation the stages of the registers will be considered as each containing the representation of a single digit. The register 1 is a conventional shifting register, digit being shifted into, along and out of the register by the application thereto of a series of shift pulses in known manner.

The computer may alternatively be adapted to work in other known modes, the digit representations being encoded in the stages of the registers in the manner appropriate to the mode of working adopted.

The shifting pulses are applied over a common line 4. For example, in order to shift the contents of the register 1 out of that register a train of shift pulses equal in number to the stages of the register, in this case twelve, is applied over the line 4 and through a gate 5 to a shift line 6 of the register and causes the contents of the register to be shifted out of the register and through one of a pair of output gates 7 and 8 to one of two transfer lines or highways 9 and 10 respectively.

A similar process allows digit representations to be shifted from a highway 12 through an input gate 11.

The highways 9 and 10 are connected to an adder/subtractor 13 which is conditioned by a signal applied over a control line 14 so that digit representing signals arriving simultaneously on the lines 9 and 10 are added or subtracted (according to the state of the control line 14) and the sum or difference is applied to the line 12.

The register 2 is connected to the highways 9 and 10 by means of gates 15 and 16 in a similar way to the register 1, and a gate 17 connects the register 2 to the highway 12. The shift line 4 is connected by means of a gate 18 to the register 2 shift line 19.

Thus, for example, to add together the values in the registers 1 and 2, the gates 5 and 18 are opened to allow shift pulses to pass to the shift lines 6 and 19 of the registers concerned. The gate 16 is opened to allow the digit representations from register 2 to pass to highway 10 and the gate 7 is opened to allow digit representations from register 1 to pass to highway 9. The adder/subtractor 13 is conditioned to add by the control signal on line 14 and the gate 11 is opened to allow the sum to pass from the highway 12 back into register 1. Had it been required to enter the sum into the register 2, then the gate 17 would have been opened instead of the gate 11.

Calculating operations carried out in this way are well known. It will be appreciated that in practice the number of shift pulses used for calculation of this type may require to exceed the number of register stages 12, to compensate for delay introduced in passing the digit representation through the adder 13. It will also be noted that the register 2 differs from the register 1 in that the register stages are connected in parallel by means of lines 20 to an input and output apparatus 70. Such an apparatus may, for example include a record card reader and a page printer of known form. Other forms of input and output are also known, for example, magnetic and paper tapes. The function of the input and output apparatus, as its name implies, is to provide a channel over which data or value representations may be entered into and results recorded from the computer.

The register 3 is somewhat similar to the register 2 in that it has output gates 21 and 22 to the highways 9 and 10 respectively and also has an input gate 23 from the highway 12. Shift pulses from the line 4 are applied to the register 3 shift line 72 through a gate 24. The register 3 is divided into two sections **3*a* and 3*b* each having six stages and the two sections are normally connected by means of a gate 25 so that the register operates as a 12-stage register similar to the registers 1 and 2**.

The register 3, however, is also arranged to provide access to the storage devices of the computer. Each stage is connected by a line 26 to a read/write selection circuit 27 of a fast access storage device 28, which in the present embodiment is a magnetic core storage device. The circuit 27 is controlled by a line 29 either to cause the representations contained in each of the stages to be written into a group of magnetic core elements in the storage device or to cause the contents of a group of elements to be read into the stages of the register.

The contents of the register 3 may alternatively be shifted out of the register and applied over a line 30 to a control circuit 31 associated with a magnetic storage drum system 54. Signals read from the magnetic drum system are applied over a line 32 to the input of the register 3. A line 33 is used to control the operations of reading from or writing onto one of the drums of the system. It will be appreciated that the storage control lines 29 and 33 may in practice be required to be separate lines for each operation but since these operations are known per se and form no part of the present invention, the foregoing explanation is deemed adequate for the present purpose.

The various calculating and data transfer operations reviewed above are performed under control of instruction representing items of data entered into a programme controller 71. In principle the programme controller has firstly a register 34 arranged to control the operation specified by an instruction entered into it and termed the operation register. Secondly the programme controller has a register 36 termed a storage register, which is so connected to the register 34 that an instruction may be transferred from the register 34 to the register 36, the connection also including a device for modifying the instruction so transferred in a manner to be explained hereinafter. In its simplest form the programme controller also has a register through which the instruction may be transferred from and to the storage device. This last register may conveniently be termed a transfer register and in the present case the register 3 is used as the transfer register. The arrangements for transferring instruction between the registers includes a path from the storage register to the transfer register and from the transfer register to the operation register, with a by-pass path connecting the storage register directly with the operation register. In the present case a somewhat more complex arrangement is used, including an additional register 35 connected into the transfer loop between the registers 36 and 34. This arrangement allows more complex operations to be carried out, including the use of double length instructions and also improves the relationship between the time spent performing processing operations on data items as opposed to time spent in loading instructions into the controller. The operation of the programme controller 71 will now be briefly described.

The controller is shown in the drawing enclosed by a dashed line and includes the three shifting registers 34, 35, 36 each having six stages. The stages of these shifting registers are similar to those of the registers 3_a_ and 3_b_ and are connected to a common shift pulse supply line 37. Instruction-representing data items are transferred in the controller in two different ways. In a first shifting operation the registers are connected end-to-end by means of gates 38 and 39 so that, with these gates open, the application of six shift pulses on the line 37 will cause the contents of register 34 to be shifted out, the contents of register 35 to be shifted into the register 34 and the contents of the register 36 to be shifted into the register 35. At the same time the output from the register 34 is applied to a line 40 and is passed to a modifying network of gates 41 and thence to the input of the register 36 over a line 42. The network 41 is arranged to add unity to the least significant digit shifted out of the register 34 and its operation will be explained hereinafter.

If, now, the gates 38 and 39 between the registers are maintained closed further connections between the register 3 and the programme controller may be used in performing the second alternative shifting operation. The input of the register 34 is connected by means of line 43, gate 44 and line 45 to the output of the first section 3_a_ of the register 3. The input of this section is connected by line 46, gate 47, and line 48 to the output of register 35. The input of register 35 is connected to the output of the second section 3_b_ of the register 3 through a gate 49, and finally, the input of the register 3_b_ is connected through a gate 50 to the output of register 36. Thus, the effect of this shifting operation is to move the contents of programme controller registers 35 and 36 into the two sections of register 3 and to move the displaced contents of register 3 into the programme controller registers 34 and 35.

It will be appreciated that in order to complete this operation it is necessary to provide the appropriate number of shift pulses to the register 3 shift line 23. The required number obviously differs from the number of shift pulses required for the shifting of the register contents during normal calculation operations. Accordingly the shift line 4, which has been described as supplying shift pulses to the registers 1, 2, and 3 during calculating operations, is connected by means of two gates 51 and 52 to alternative sources of shift pulses. A line 53 carries the train of pulses required under normal calculation conditions and these pulses are applied through the gate 51 to the line 4. However, during the transfer operation between the register 3 and the programme controller, the gate 52 is opened and this gate passes shift pulses from the line 37 to the line 4. Thus, during this transfer operation, the programme controller registers 34, 35 and 36 and the registers 3_a_ and 3_b_ are shifted in synchronism.

It will also be seen that under these alternative transfer conditions the contents of the register 34 of the programme controller which were shifted out are passed through the modifying network 41 and thence to the input of the register 36 in the manner already described.

As will be explained, the purpose of the shifting operation described above is to load the programme controller 71 with instructions derived from the storage device 28. In the particular embodiment shown, because there are three registers, 34, 35 and 36 in the programme controller it is possible to transfer two simple programme instructions.

The first transfer operation reviewed above is used to select these instructions in turn to control the operation of the computer and the second transfer operation is used to reload the programme controller with a new pair of programme instructions. Again, in the particular embodiment shown, it is also possible to perform more complex operations involving transfers of data items to and from the magnetic drum store 54. In the latter case a double-length instruction is required and this instruction is contained in the two registers 34 and 35. However, for the sake of simplicity it is proposed firstly to deal with single-length instructions consisting of six digits each in which case the computer operations are controlled by the register 34 only and for the sake of clarity, simplified instructions will be assumed, which consists of three principal parts each having a particular purpose in determining the operation to be performed. It will be appreciated, however, that in practice complex instructions are used in which the various code components making up each digit of the instruction may individually have separate functions in controlling a programme step. Furthermore these instructions may, in practice, contain a larger number of digits to specify the required operations.

An instruction consists of six digits and when it is in the correct position in the controller 71 to control the computer it occupies the positions A to F of the register 34 shown in the drawing. For the sake of simplicity it is assumed that digits in positions A and B denote the character of the operation to be performed and the locations of the operands in the registers 1 to 3. The digit in position C has a special significance and will be considered later. The digits in positions D to F specify address locations in the core storage device and are used whenever the operation involves an operand derived from or to be directed to this device. When a digit is not required for the performance of a programme stop a zero is written in the appropriate positions.

In order to explain the operation of the programme controller, it will be assumed that the register 34 contains an instruction 210000 which signifies "Add the contents of register 2 to the contents of register 1 and put the sum into the last-named." The digits 21 are passed from the register 34 over lines 55 to a decoding network 56, known as a function decoder. This decoder consists of a conventional diode decoding matrix and passes signals over a group of control lines 57. These are connected to the gates associated with the shift, input and output paths of the various registers. In the present case signals are passed over the control lines denoted by the references 57_a_ and associated with the gates 7, 16, 11, 51, 5 and 18. The gate 7 allows the contents of register 1 to be shifted on to highway 9, the gate 8 allows the contents of register 2 to pass to highway 10 and the gate 11 allows the sum from highway 12 to pass back into register 1. The gates 5 and 18 allow shift pulses from line 4 to pass to shift lines 6 and 19 of registers 1 and 2, and the gate 51 is closed to allow the shift pulse source 53 to supply the pulses to the line 4.

At the same time other outputs from the function decoder 56 condition other units required in the calculation. A signal transmitted over line 14 conditions the adder/subtractor 13 to add the digit representations presented on highways 9 and 10. A line 58 transmits a signal to a pulse generator 59 which then performs an operating cycle to generate the train of shift pulses required on the line 53. At the conclusion of this cycle a signal is passed by the pulse generator over a line 60 to the function decoder 56 to signify the completion of the operation.

It will further be assumed at this sage that the next instruction to obeyed is already in the register 35 and the operation complete signal is then used to initiate the transfer of this instruction into the register 34.

This signal is decoded in the decoder and causes signals to appear on control lines referenced 57_b_ in the drawing and associated with the gates 38 and 39 to allow the contents of the programme controller registers 36 and 35 to be shifted into registers 35 and 34 respectively. At the same time the pulse generator 59 is signalled over the path 58 and a train of six shift pulses is applied over the shift line 37 of the programme controller registers to allow this transfer to tage place. The contents of the register 34 pass over the line 40 and through the network 41 to the register 36 as previously described. The network 41 is arranged so that the first digit passing through from the line 40 has unity added to it. A "9" detecting circuit is also incorporated in the network so that if the digit to be modified has a value of 9, this digit is passed to the line 42 "0" and unity is added to the next digit on the line 40. The adding circuits are controlled by correctly timed pulses generated by the pulse generator and passed over a line 61. This effect of this addition is that the value represented by the digits D, E, F is increased by unity as the contents of register 34 are transferred to register 36.

At the conclusion of this operation the new instruction has been entered into the register 34 from register 35 and a new cycle of operations then takes place to complete the new programme step.

It will be recalled that the digits in positions D, E and F of the register represent the address of a location within the core storage device 28. In order to utilize information from this location the contents of the location must first be transferred to the register 3, after which the contents of the register 3 are treated in the usual way.

This transfer may be accomplished as the result of a simple "transfer to register 3" instruction or it may be performed as the necessary preliminary to the performance of a more complex programme step. In either case, however, the transfer is performed in the following manner.

The digits in positions D, E and F of the programme control register 34 are applied through gates 62, 63 and 64 respectively to set an address register 65 which is associated with the storage device. The gates 62 to 64 are opened by control lines referenced 57*c* whenever the input digits A and B to the function decoder indicate an instruction requiring an operand to be selected from the core storage device. The address register applies output signals representing the address defined by the digits in the D, E and F positions to a selection matrix 66. This matrix is a diode decoding network adapted to select the required storage location in the storage device. The selection is performed in known manner by forcibly setting the cores of the selected location to a predetermined state. Windings associated with the individual cores are coupled to the read/write selection circuit 29 and signals representing those cores which have been changed as the result of this forcible setting are passed to the stages of the register 3 over the lines 26 to set these stages to correspond to the digit representations originally stored in the selected location.

Since this transfer operation results in the resetting of the storage cores in the location which has been selected it is the usual practice to re-transfer the digit representations now registered in register 3 back into the location from which they were read. This transfer takes place without alteration to the representations in the register. A similar operation is required in order to transfer the contents of the register 3 to an empty storage location in the core store as the result of a simple transfer instruction or as a part of a more complex instruction.

In the case of a re-transfer the storage location is already selected by the digits D, E, and F and the digit representations are registered in the stages of the register 3. The original transfer from the location was accomplished by passing a signal over line 29 from the pulse generator 59 so that the cores in one location were forcibly set to one state. The retransfer operation requires a pulse to be delivered over a similar path from the pulse generator. This pulse, however is a current pulse of half the value required to switch a core, the additional half current required for the storage of the digit representations being derived in conventional manner from those register stages which represent binary code components of value 1.

The various transfer operations described are used to permit the automatic following of a succession of programme steps under control of the programme controller. The control of this succession is dependent upon a controlling digit in an instruction. This digit occupies the position C of the register 34.

It will be recalled that upon completion of a programme step a new instruction was shifted from the register 35 into the register 34. It will now be assumed that this instruction is in form 001201, that is to stay, digits are omitted from positions A and B so that no calculation operation has been specified. However, the controlling digit in position C is present and the digits in positions D, E and F specify a core storage location 201.

A digit occurring in the position C of an instruction is used to control the transfer of further instructions into the programme controller and an instruction containing this digit is conveniently termed a loading instruction. A transfer of this type will thus be referred to as a programme controller loading operation and this operation will now be described.

The digit representation in position C is passed to the decoder 14 and the consequential outputs from the decoder control the loading operation. This operation requires a two-stage transfer of information together with a re-transfer operation and involves, firstly, the transfer of the contents of the specified location of the core storage device into register 3: secondly, the re-writing of the contents so transferred back into the same location in order to preserve them; and lastly the shifting of the contents of the register 3 into the registers 34 and 35 of the programme controller.

The transfer of the storage location contents into the register 3 is performed as described and after the re-transfer or preservation operation the appropriate control lines, referenced 57*d*, associated with gates 52, 24, 44, 47, 49 and 50 are opened so that shift pulses from the line 37 are applied to the shift lines of registers 34, 35, 36, 3*a* and 3*b* to shift the contents of registers 3*a* and 3*b* into registers 34 and 35 respectively and the contents of registers 34 and 35 into the registers 3*a* and 3*b* respectively as previously described. At the same time the loading instruction 001201 is transferred out of the register 34, modified by the addition of 1 in the network 41 and is re-entered as 001202 into register 36.

The contents of the core storage location 201 are thus transferred to the registers 34 and 35. It will be apparent that in this case a storage location contains two programme instructions which are to be obeyed in succession.

The programme stop defined by the programme instruction now in register 34 is performed and when it is completed the instruction transfer described takes place, with the result that the next programme instruction from the register 35 is shifted into register 34. At the same time the loading instruction 001202 is shifted from register 36 into register 35.

The programme instruction now in register 34 is obeyed and once again the shifting of instructions takes place. The loading instruction 001202 is thus shifted into register 34 and causes the loading of two new instructions from the core storage device into registers 34 and 35. Upon this occasion these instructions are derived from storage location 202, and after loading is completed the loading instruction is transferred through the network 41 into register 36, where it is registered in the modified form 001203. Thus, the normal operation of the computer consists of the loading of the programme controller with two instructions, the performance of the programme steps defined by those instructions and the re-loading of the controller with a new pair of instructions.

This sequence continues, the modification of the loading instruction by the network 41 ensuring that pairs of programme instructions are derived from successive storage locations. This is normal operation of the apparatus, a programme consisting of pairs of instructions in consecutive storage locations.

It will also be apparent that if one of the instructions loaded into the programme controller registers from a storage location, is in the form of a loading instruction, 001XYZ, where the digits XYZ specify a storage location which is not in the sequence of locations currently being used, the programme will be diverted to a new succession of locations beginning with that represented by the digits XYZ.

If this new loading instruction is the second of a pair of instructions transferred as described, it will pass into the register 34 at a time when the modified loading instruction of the old succession (that which initiated the transfer) is in register 35. Since the instruction in register 35 is transferred to register 34 it follows that, if the first instruction of the new succession is arranged to control the transfer into a predetermined storage location of the contents of register 3, the next succeeding location of the old series may be recovered from the predetermined location by a loading instruction specifying the predetermined location and occurring at a later point in the new succession. This provides a convenient method of entering and leaving self-contained sub-programmes occurring within a main programme, and in practice it will be apparent that the predetermined location is conveniently the last location of the sub-programme.

It will be seen from the foregoing description that the programme controller may be regarded as having an operation-controlling register 34, a storage register 36 which primarily stores the address of the next required programme instruction and a further register 35 which functions as an auxiliary storage register and holds the second of a pair of instructions contained in a storage location until required to control a programme step. It will be appreciated that if all instructions are single length (i.e. they contain only six digits), and if a storage location is only large enough to accommodate only one single length instruction, the register 35 may be omitted, the operation of the apparatus then following a two-stage pattern consisting of a loading operation alternating with a single programme step. In this case the register 3 will, of course, have only six stages and the programme control arrangement may be seen to consist of the registers 34, 36 and 3 arranged in a loop formation, the network 41 being interposed between the registers 34 and 36. The transfer operations round the loop then consist of a transfer in response to a loading instruction which shifts the contents of each register to the next register round the loop and an alternative transfer operation which occurs in response to the completion of a programme instruction and in which the register 3 is bypassed so that the modified loading instruction in the register 36 passes directly into the register 34.

The arrangement shown in the drawing, however, has the advantage that by using simplified instructions which occupy only half the length of a storage location, two programme steps may be executed for each loading instruction, so that a greater proportion of the operating time of the computer is spent performing the steps of the programme than would otherwise be the case.

However, some computer operations require a more complex instruction than can be accommodated in the single-length form and instructions relating to these operations are in double-length form, that is only a single instruction is stored in a location and this instruction has up to twelve digits for example transfers between the storage device 28 and the drum storage device 54 must specify not only the type of operation (transfer) but the addresses of the storage location in the device 28 and of the storage location on the drum. In order to demonstrate the operation of the programme controller under these conditions transfers between the two kinds of storage device will now be described.

It will be recalled that data may be transferred to and from the magnetic drum storage device into or out of register 3. For these transfer operations registers 34 and 35 of the programme controller are both used to contain a single instruction.

The registers are loaded in the usual way by means of a loading instruction specifying the core storage location from which the drum transfer instruction is to be derived. After the loading is completed the loading instruction, with its core storage address modified to select the storage location containing the next succeeding programme instruction, is shifted into register 36 in the manner previously described. This loading instruction will be referred to in the following description as the "next required loading instruction."

The digits now in register 34 are passed to the function decoder 56 to control the operation to be performed in the usual way. The digits in positions A and B specify the type of operation, for example, an operation involving the transfer of the contents of a number of consecutive core storage locations to the magnetic drum store. The contents of a location will be referred to as a "word," and the core store location from which the first word is to be transferred is specified by the digits D, E and F. The digit C is not used in this operation and is not present in the instruction.

The stages of the register 35 are connected to a control unit 80 associated with the drum store 54 but the contents of these stages are ineffective for control purposes in the case of those operations which do not involve the drum storage device. This is because the control unit 80 contains a group of entry gates which are conditioned by a control line 81 from the function decoder 56 so that they are maintained closed whenever the digits in positions A and B of register 34 indicate that the operation to be performed does not involve the drum store. However, since the digits A and B are now recognised by the function decoder 56 as constituting an operation involving the drum store, the gates in the unit 80 are opened and the stages of register 35 are rendered effective as an extension to the control register 34 in order to deal with the double length instructions.

Digits in five positions, H to L, of register 35 are effective for control purposes. Of these, the digits in positions H and I specify the drum and track to be used. The digits in position K and L specify the location within the given track that the first word to be transferred is to occupy. Thus, the digits in the positions H, I, K and L together specify the address of the first drum location involved in the transfer and are entered into a drum address register in the control unit 80. The digit in position J is used to specify the number of consecutive words to be transferred and this digit is entered into a cycle counter, also contained in the control unit 80.

For the purposes of the following description, therefore, the contents of the programme controller registers may be regarded as follows. Register 34 contains the first required core store location: register 35 contains the first required drum store location and register 36 contains the address of the next required loading instruction.

The function decoder controls the operations to be performed in the usual way by signals applied over control lines to open the required gates and cause generation of the required pulses by the pulse generator 59. The steps in carrying out the required transfer are briefly as follows.

The word in the first core store location is transferred to register 3 as previously described. At this time the address of the first drum store location is registered in the drum address register of the control unit 80. The programme control registers are shifted by six shift pulses.

The contents of the control registers are then: register 34, first drum location register 35 next required loading instruction; register 36, second core store location (this is because the storage location is modified by the addition of 1 in being shifted into this register).

The drum store is now prepared to accept the word to be transferred. This is a conventional operation in which the contents of the drum address register are compared with the addresses of successive locations presented at the recording head as the drum rotates. When the coincidence of these addresses indicates that the required location has been reached the word in register 3 is shifted through the read/write control 31 and is written on to the drum.

For this purpose the shift pulses applied to the register 3 are derived from the drum so that the contents of the register stages are shifted out in synchronism with the presentation of the appropriate recording positions in the track at the recording head. These shift pulses are applied to the register from the read/write control 31 over a line 67 and through a gate 68. This gate is opened during transfers to and from the drum store by a control signal derived from the function decoder in the conventional way and applied over the line 33.

When the writing of the contents of register 3 on to the drum is started, a shifting cycle containing 18 shift pulses is applied to the programme controller registers. After six of these pulses, the contents of the registers is as follows: Register 34 next required loading instruction; register 35; second core store location; register 36, second drum location (i.e. first drum location plus 1). During the next six shift pulses the network 41 is inhibited by a control signal over the line 61 from adding 1 so that after the twelfth shift pulse the registers contain: register 34, second core store location; register 35, second drum location; register 36, next required loading instruction (unchanged). The inhibiting signal on the line 61 is automatically generated when the pulse generator 59 is conditioned by the function decoder 56 to provide the 18 pulse cycle.

At this point it will be seen that the addresses of the next required storage locations are in the correct registers to control a new transfer. Accordingly the newly specified drum location address is put into the drum address register of the unit 80 and the specified location in the core store is passed to the address register 65. This is possible because the old drum location is not required once the coincidence condition is established and the transfer from the first core store location has already been completed.

The remaining 6 shift pulses are now applied to the programme controller registers and after the eighteenth pulse the contents of the registers are: register 34, second drum location; register 35, next required loading instruction; register 36, third core store location. The pulse generator 59 also has a further facility in that an impulse is passed over a line 82 to the control unit 80 to subtractions from the cycle counter therein to indicate the completion of an 18 pulse cycle. At the end of the complete cycle of 18 shift pulses the address of the second drum location required is held in the drum address register ready to be compared with the next drum address read from the drum. Since the addresses in both cases are successive, coincidence will be detected when the new drum address has been read. However, during this step of recognition the word from the second core store location is transferred into register 3 so that upon detection of coincidence the word from the specified core store location is ready to be written on to the drum as before.

This cycle of operations during which the 18 shift pulses are applied to the programme controller is reposted for the number of times specified by the digit originally in position J of the register 35 which is indicated by the reduction of the cycle counter total to zero. Recognition of this condition is passed back over the path 82 to the pulse generator to initiate a final shifting phase.

This final phase consists of the application of 6 shift pulses to the programme controller and the generation of the usual operation complete signal applied over the line 60. Since after each successive cycle the register 35 contains the next required loading instruction, the application of the final six shift pulses transfers this instruction to the register 34. It will be recalled that this instruction is a loading instruction requiring the contents of the core store location containing the next programme instruction to be transferred into the programme controller. Thus, the programme controller is once again loaded with the correct instruction to control the next step in the programme.

An operation which requires items of data to be read from the drum is dealt with in a somewhat similar manner. The registers 34 and 35 are again loaded with a double-length instruction. For example, in an instruction requiring the words from specified drum locations to be transferred to locations in the core store, digits in positions A and B specify the operation and the digits D to F and H to L have the same significance as in the previous example. After the loading operation is completed the contents of the registers 34 to 36 consist essentially of the following items: register 34, first core store location; register 35, first drum location; register 36, next required loading instruction. As before, the drum location is entered into the drum address register and six shift pulses are applied to the registers 34, 35 and 36. In this case, however, the pulse generator 59 inhibits the network 41 from modifying the items passing through it. Consequently, at the end of this operation the programme controller registers contain: register 34, first drum location; register 35, next required loading instruction; register 36, first core store location (unchanged). As in the previous case the drum location addresses are compared with the required address in the address register and upon coincidence the word from the specified location is read from the drum and passed over lines 32 and 46 to the register 3. Again, a cycle of 18 shift pulses, similar to the cycle described in the previous example, is applied to the programme controller registers 34 to 36. After the first six of these pulses the contents of the registers are: register 34, next required loading instruction; register 35, first core store location; register 36, second drum location (first location plus 1). As in the previous example the network 41 is inhibited from adding 1 to the items passing through it during the next six shift pulses, so that after the twelfth pulse the registers contain: register 34, first core store location; register 35, second drum location; register 36, next required loading instruction. At this point the drum and core store locations are entered into the drum address register and the address register 65 respectively as described in the previous example. In this case the drum location specified is actually the second location required, but the core store location specified is that in which the word from the first drum location is required to be stored.

The remaining 6 shift pulses are now applied to the registers 34 to 36 and after the eighteenth pulse the registers contain: register 34, second drum location; register 35, next required loading instruction; register 36, second core store location.

As in the previous case the second drum location required is specified by the contents of the drum address register so that upon the detection of coincidence between this register and the drum address read from the drum a further transfer of a word from the drum to register 3 is initiated. It is during this step of recognition that the contents of register 3 are transferred to the specified core store location, leaving the register 3 ready to receive the new word from the drum.

The cycles of 18 shift pulses are repeated for the number of times specified by the digit in position J of register 35 as in the previous case.

When this series of cycles has been completed the restoration of the cycle counter to zero causes the application of six shift pulses to the registers 34 to 36 in the normal way, to bring the next required loading instruction into register 34 to reload the programme controller.

It will be seen from the foregoing examples that the programme controller is adapted automatically to select instructions in order from a succession of storage locations and each instruction may be either single or double-length in dependence upon the operation to be performed. Moreover, a succession of instructions requires only a single entry of the first storage location to be selected, successive locations being selected in order. Thus the main programme should preferably consist of a succession of instructions stored in consecutive locations of the storage device. During the succession of instructions the programme control device is so arranged that after a programme instruction has been loaded into the device the loading instruction is modified to specify the storage location from which the next required instruction is to be transferred. This modified address is held unchanged by the programme control device until after the occurrence of an operation complete signal denoting that a new programme instruction is required. This is true whether the current instruction is a single or a double-length instruction and whether the current instruction is performed in a single cycle or takes many cycles as in the case of the transfer of a group of works to or from the drum.

The sequence of instructions forming the main programme may, however, be interrupted, for example for the performance of sub-routines, the main programme being resumed at the next following instruction upon completion of these sub-routines.

It is necessary, for example, in order to start the apparatus, to provide a device for selecting the location of a first instruction of a series. In order to start the apparatus, the first instruction of the main programme is selected by entering a loading instruction into the register 34. This is conveniently performed by means of an instruction set-up device 69. This device may, for example consist of a group of manually operated keys. The operation of the required keys selects the settings to which the stages of the register 34 are required to be set. An entry key is then used to forcibly set the selected stages. It will be appreciated that this device may be modified to select a predetermined instruction automatically upon the application of a start signal. For example, in order to start the apparatus, a loading instruction specifying the address of the storage location containing the first instruction of the main programme is stored in a register and the start signal is used to forcibly set the operation register 34 to this loading instruction, for the case where the programme is first required to be loaded into the storage device a modification of this arrangement may be used. In such a case the programme is entered by means of an input device 7, such as a card or tape reader. Part of the storage device then contains a pre-recorder sequence of instructions that control this entry operation. In this case the start signal controls the loading of the first of these entry instructions and the entering operation continues until the programme has been completely entered, the last entry instruction being a loading instruction which loads the first of the main programme instructions into the register 34.

During the operation of the computer it is frequently necessary to perform various input and output operations by transferring data items between the computer and input or output data registering devices and it is often desirable to interrupt the main programme for this purpose. Under these conditions the instruction set-up device 69 contains a register for each of the input and output devices. Each of these registers contains a loading instruction specifying the address of the first instruction of an appropriate pre-recorded input or output succession, a part of the storage device being allocated for this purpose. In each of these successions the last location is either empty or contains a loading instruction specifying an address N. In the former case the first instruction of the succession contains an instruction to write the next required main programme instruction from the storage register 35 into the last location of the succession and in the latter case this first instruction controls the writing of the contents of register 35 into the address N. Thus, in both cases the address of the next main programme step is preserved and the main programme is resumed automatically after the input or output operation is completed.

In order to ensure that the interruption of the main programme can only take place without interfering with an operation already being carried out, the actual loading of the interrupting succession is controlled in the following way. Each input or output device has an indicating signal line 75 and is arranged to pass a signal over this line whenever it is ready to operate. The lines 75 are connected to a master indicating unit 76 which has a group of output lines 77, one for each register of the instruction set-up device. The lines 77 select the appropriate register to be read out to forcibly set the register 34. The unit 76 also has an output line 78 which is connected by a multi input AND gate 79 to the function decoder 56. The gate 79 is opened under joint control of the third stage of the register 35 and of the operation complete signal line 60. Thus, the signal on the line 79 is passed to the junction decoder only when the current main programme instruction has been completed and the loading instruction for the next main programme step is in the register 35, signified by the presence of the loading control digit in the third stage of the register. The function decoder 56 responds to this applied signal to control the transfer of the contents of the selected register of the instruction set-up device 69 into the register 34.

From the foregoing examples it will be appreciated the registers 34 and 36 of the programme controller may be regarded as an operation register and a storage register respectively. The register 35 functions either as an additional storage register in the case of 6-digit instructions or as an extension to the operation register in the case of double-length instructions. In both cases, however, a loading instruction is first applied to the operation register 34 to cause a programme instruction to be selected from the core store and shifted into the operation register 34. This shifting operation also causes the loading instruction to be shifted into the storage register 36 in modified form so that it now specifies the next required core store location. Upon completion of the programme step or steps specified by the programme instruction last entered into the operation register 34, the modified loading instruction is again shifted into this register to cause the selection of a new programme instruction. The entire sequence is then repeated.

It will thus be apparent that if all instructions are the same length the provision of two registers only, one functioning as a storage register and one as an operation register, will provide an operating sequence consisting of a loading phase followed by an operational phase and these phases will alternate throughout the operation of the computer. It will be apparent, however, that provision must be made for the transfer of selected instruction between the registers of the programme controller and the storage device, and for this purpose a transfer register, similar in operation to the register 3 is provided. Thus, in the simplest case the apparatus includes three registers (i.e., operation, storage and transfer) connected in a loop with gates, similar to the gates 38, 39, 44, 47, 49 and 50, arranged to by-pass the transfer register only for transfers following the presence of a programme instruction in the operation register and with means for modifying a loading instruction transferred out of the operation register into the storage register.

The provision of additional registers as extensions to the operation register obviously enables the relationship of loading time to operational time to be improved since the number of operational instructions which may be obeyed between any two adjacent loading instructions is increased accordingly. However, this latter condition requires that a specified storage location must have sufficient capacity to store the required number of programme instructions and it follows from this that the transfer register will actually consist of a number of auxiliary registers each corresponding to one section of the register 3 and each containing the same number of stages as each of the additional operation registers.

The storage device from which the instructions are selected has been described as a core storage device but it will be appreciated that other known forms of storage device, such as for example, a neon tube store, may be used.

The examples of instructions given in the foregoing description are simplified for the make of clarity and it will be recalled that the digits in positions A and B have been described as specifying the type of operation, e.g. "Add" and the locations of the operands. It will be appreciated however, that, in practice instructions may be much more complex. Even in the simple case shown the digits D, E and F may be used to specify the locations of the operands in programme instructions. For example, an instruction requiring that operands in registers 2 and 3 are to be added and the sum placed in register 1, might be expressed as 210231, where the first two digits 21, represent the code for "Add," and the digits 231 represent the required locations of the two operands and the sum. Under these circumstances the digits in positions D, E and F are normally applied to the decoder 56 to control the opening of the appropriate register gates. This section is effective so long as an instruction does not contain the loading control digit in position C. The occurrence of this digit, however, is arranged to render ineffective the decoder connections from digit positions D, E and F and allow these positions to become effective to select the core store location to be read into register 3 for subsequent transfer into the programme controller registers. The digit in position C may also have values to allow the selection of the contents of a specified core store location to be transferred into register 3 as part of a programme step and not as part of a loading operation. In this case the loading control digit is a predetermined value digit occurring in position C.

Hence, it follows that as instructions are shifted into the operation register 34 of the programme controller they are obeyed as programme instructions or as loading instructions in dependence upon the value of the digit in position C and in consequence a loading instruction is defined under these circumstances as an instruction having a digit of predetermined value in the loading control position.

What I claim is:

1. Program control apparatus for controlling processing operations performed in electronic data processing apparatus on information in response to a succession of instructions each defining a program step derived from a sequence of separately addressable storage locations of a main storage device, including an operation register and a storage register, which apparatus is responsive to the transfer into the operation register of a loading instruction specifying the address of a location in the main storage device to cause a main program instruction stored in the specified address to be transferred to the operation register concurrently with the transfer of the loading instruction out of the operation register into the storage register, means for modifying the loading instruction during this transfer to specify the address of the next required main program instruction, means for retransferring the modified loading instruction back into the operation register at the conclusion of a program step whereby the operations of loading and processing in response to the main program instructions proceeds alternately, means for entering a loading instruction directly into the operation register to interrupt the main program and means for transferring a modified loading instruction relating to the main program from the storage register into a predetermined location of the main storage device.

2. Program control apparatus for controlling processing operations performed in electronic data processing apparatus on information in response to a succession of instructions each defining a program step derived from a sequence of separately addressable storage locations of a main storage device, including an operation register arranged to control the processing operations according to the instruction entered thereinto, a storage register and a transfer register, means for selecting a storage location in response to an address specified by an instruction in the operation register, means for transferring a data item between the transfer register and the selected location, means for concurrently transferring a data item from the storage register to the transfer register, from the transfer register to the operation register and from the operation register to the storage register in response to a loading instruction contained by the operation register whereby the operation register is loaded with a program instruction from the selected storage location, means for modifying the loading instruction during the transfer to specify the address of the next required program instruction, means for transferring the modified loading instruction directly from the storage register to the operation register at the conclusion of the current program step and means for directly entering a loading instruction into the operation register.

3. Apparatus as claimed in claim 1 in which the operation register and the storage register are connected in loop formation with a transfer register having transfer lines to the main storage device and arranged to transfer an instruction to or from a specified storage location, instructions being transferred from one register to the next in one direction round the loop, the loop also including a modifying device between the operation and storage registers and gating means arranged to switch the loop connections to by-pass the transfer register to allow an instruction to be transferred directly from the storage register to the operation register.

4. Apparatus as claimed in claim 3 in which the instructions comprise program instructions and loading instructions both expressed as a plurality of digits, the program instructions including digits defining a processing operation to be performed and the loading instructions including a loading control digit signifying that a new instruction is to be loaded into the operation register from the storage device, each of the digits being entered into a predetermined stage of the operation register, those stages into which the operation-defining digits and the loading control digit are entered being connected to a decoding arrangement operative in response to the entry of the digit or digits to control the performance of the required operation and to control the said gating means.

5. Apparatus as claimed in claim 4 in which the decoding arrangement also controls a pulse generator arranged to provide a predetermined succession of control impulses according to the operation to be performed, such impulses being arranged to control the transfer of instructions round the loop, and to provide a signal at the conclusion of the control impulse succession to denote the completion of the operation, the said signal being applied to the decoding arrangement.

6. Apparatus as claimed in claim 5 in which the decoding arrangement is responsive to the absence of the loading control digit to render the gating means effective to by-pass the transfer register and is responsive to the operation complete signal to control the advance of the instructions in the loop by one register.

7. Apparatus as claimed in claim 6 in which the operation register also includes a group of stages into which digits are entered specifying a storage location address, the address stages being connected to an address selecting arrangement associated with the storage device, the address selecting arrangement being operable in response to the address digits to select the specified location for the transfer of an instruction.

8. Apparatus as claimed in claim 7 in which the decoding arrangement is responsive to the presence of the loading control digit to control the transfer of an instruction from the selected location to the transfer register, to control the advance of the instructions in the loop by one register, and to render the gating means ineffective to by-pass the transfer register.

9. Apparatus as claimed in claim 8 in which the modifying device is arranged to add unity to the total represented by the address-representing digits of a loading instruction, the succeeding addresses of the locations of the storage device in which the main program instructions are stored being consecutively numbered.

10. Apparatus as claimed in claim 9 in which the means for entering an instruction directly into the operation register consists of a group of manually controlled switches connected to the stages of the operation register.

11. Apparatus as claimed in claim 8 in which the means for entering an instruction directly into the operation register includes a further register, the stages of the further register being settable to predetermined states to represent a loading instruction containing the address of a storage location in which the first instruction of a program sequence is stored, and means for transferring the contents of the further register directly into the operation register.

12. Apparatus as claimed in claim 9 in which the means for entering an instruction directly into the operation register includes a group of entry registers, each register being settable to contain a different predetermined loading instruction specifying the address of a storage location in which the first of a succession of instructions relating to a sub-program is stored, each entry register being associated with a different sub-program, means for selecting one of the entry registers and means for transferring the contents of the selected entry register into the operation register.

13. Apparatus as claimed in claim 12 in which the addressed first location of the succession is preset to represent an instruction requiring the contents of the transfer register into the storage device.

14. Apparatus as claimed in claim 12 in which means for transferring data items between the processing apparatus and a data registering device is associated with at least one of the entry registers, the registering device having means for indicating that it is ready to perform the transfer, the indicating means being arranged to select the associated entry register and in which the means for transferring the contents of the selected entry register into the operation register is conditioned to initiate the transfer by the operation complete signal generated at the conclusion of a program step.

15. Apparatus as claimed in claim 9 having an auxiliary register and a second transfer register are connected in the loop between the first said transfer register and the operation register, the gating means being arranged to by-pass both first and second transfer registers whereby, in response to a loading instruction, two program instructions are transferred from a single storage location, one program instruction being transferred into the operation register and the second program instruction being transferred into the auxiliary register and, in response to the operation complete signal at the conclusion of the program step defined by the first program instruction, the second program instruction is transferred directly from the auxiliary register into the operation register.

16. Apparatus as claimed in claim 9 in which an auxiliary register and a second transfer register are connected in the loop between the first said transfer register and the operation register, the gating means being arranged, in response to a loading instruction contained in the operatoin register to pass a double-length instruction transferred from a single addressed storage location to both transfer registers from the transfer registers into the operation and auxiliary registers, the decoding device being arranged in response to the operation-defining digits of the double length instruction to render the operation and auxiliary registers jointly effective as a single register to control the operation thereby defined, and being further arranged in response to the operation complete signal to control the transfer of the modified loading instruction directly from the storage register into the operation register.

17. Apparatus as claimed in claim 16 in which the decoding device is arranged in response to a loading instruction contained in the operation register to control the passage of a first and a second data item stored in a single storage location specified by the loading instruction concurrently into the operation auxiliary registers, the data item in the operation register then including operation-defining digits specifying whether the data items separately define two separate operations to be performed or jointly specify a single operation, the decoding device being responsive to the operation defining digits either to perform two program steps or to perform a single step as specified thereby, and further being responsive to the last or the operation complete signal to control the transfer of the modified loading instruction into the operation register.

18. Apparatus as claimed in claim 9 in which the loop includes a transfer register having a plurality of sections, each section comprising a register having a number of stages equal to the number of stages in the operation register, each location in the storage device having as many digit storage positions as are included in the transfer register, the loop also including one or more auxiliary registers, the number of auxiliary registers being one less than the number of sections in the transfer register, the auxiliary registers being interleaved in the loop with the transfer register sections, whereby a plurality of instructions are transferred from the storage device into the operation and auxiliary registers from a single addressed storage location in response to a loading instruction and means for transferring the instructions in turn from the auxiliary registers into the operation register on completion of the program step defined by the preceding instruction in the operation register, the gating means being arranged to transfer the modified loading instruction into the operation register upon completion of the last program step defined by an instruction transferred in turn from an auxiliary register.

19. Program control apparatus for controlling processing operations performed in electronic data processing apparatus on information-representing data item according to successive steps of a predetermined main program in response to a succession of data items representing instructions derived from a sequence of separately addressable storage locations of a main storage device including an operation register, a storage register, a transfer register, transfer control means operable in response to an instruction contained in the operation register to control the transfer of data items into and out of the registers, the operation register having a first predetermined stage arranged to receive a loading control digit and second predetermined stages arranged to receive digits specifying a store location address, means for transferring an instruction from specified location into the transfer register, a first transfer path including address modifying means over which an instruction is transferred out of the operation register into the storage register, a second transfer path including gating means over which an instruction may be transferred out of the storage register into the transfer register, a third transfer path including gating means over which an instruction may be transferred out of the transfer register into the operation register, a fourth transfer path including gating means over which an instruction may be transferred out of the storage register into the operation register, gating control means operable under control of the transfer control means to select the transfer paths over which instructions are transferred, the transfer control means being operable in response to the presence of the loading control digit in an instruction contained in the operation register to initiate the concurrent transfer of instructions over the first, second and third transfer paths and being operable in response to the absence of the loading control digit at the conclusion of a program step to initiate the concurrent transfer of instructions over the first and fourth transfer paths, means for transferring an instruction from the transfer register into the specified storage location and means for entering an instruction directly into the operation register.

No references cited.